(12) United States Patent
Rozhavsky et al.

(10) Patent No.: US 7,295,817 B2
(45) Date of Patent: Nov. 13, 2007

(54) WIRELESS DATA COMMUNICATION UNIT

(75) Inventors: Leonid Rozhavsky, Tel Aviv (IL);
Nissim Farhuma, Tel Aviv (IL); Olga Novik, Tel Aviv (IL)

(73) Assignee: Motorola, Inc., Schaumburg, IL (US)

( * ) Notice: Subject to any disclaimer, the term of this patent is extended or adjusted under 35 U.S.C. 154(b) by 362 days.

(21) Appl. No.: 10/674,137

(22) Filed: Sep. 29, 2003

(65) Prior Publication Data

US 2004/0127176 A1   Jul. 1, 2004

(30) Foreign Application Priority Data

Oct. 10, 2002   (GB)   ................................ 0223525.7

(51) Int. Cl.
*H03C 1/62* (2006.01)

(52) U.S. Cl. .................. 455/115.1; 455/91; 455/115.2; 455/115.3; 455/114.2; 455/515; 455/507; 455/434; 375/219; 375/267; 375/147; 375/134; 370/375; 370/376; 370/335; 370/459; 370/458

(58) Field of Classification Search ............. 455/115.1, 455/515, 507, 67.11, 115.2, 115.3, 114.2, 455/434, 91, 437, 436, 443, 552.1, 422.1; 370/337, 338, 348, 459, 461, 431, 462, 468, 370/375, 376, 335, 458; 375/219, 267, 147
See application file for complete search history.

(56) References Cited

U.S. PATENT DOCUMENTS

| 5,404,353 | A |  | 4/1995 | Ben-Michael et al. |  |
| 5,729,541 | A | * | 3/1998 | Hamalainen et al. | 370/337 |
| 5,734,963 | A | * | 3/1998 | Fitzgerald et al. | 340/7.25 |
| 6,078,957 | A | * | 6/2000 | Adelman et al. | 709/224 |
| 6,256,319 | B1 | * | 7/2001 | Apgar et al. | 370/450 |
| 6,621,801 | B1 | * | 9/2003 | Wright et al. | 370/319 |
| 6,975,603 | B1 | * | 12/2005 | Dicker et al. | 370/329 |
| 7,068,992 | B1 | * | 6/2006 | Massie et al. | 455/403 |
| 2003/0043770 | A1 | * | 3/2003 | Moon et al. | 370/337 |
| 2003/0045288 | A1 | * | 3/2003 | Luschi et al. | 455/434 |
| 2003/0081574 | A1 | * | 5/2003 | Moon et al. | 370/334 |
| 2003/0153276 | A1 | * | 8/2003 | Terry et al. | 455/69 |
| 2004/0214582 | A1 | * | 10/2004 | Lan et al. | 455/452.2 |

FOREIGN PATENT DOCUMENTS

| GB | 2236606 | A |  | 4/1991 |
| GB | 2236606 | A | * | 4/1991 |
| GB | 2376693 | A |  | 12/2002 |

* cited by examiner

*Primary Examiner*—Joseph Feild
*Assistant Examiner*—Khai Nguyen

(57) ABSTRACT

A wireless data communication unit (700) shares a data communication resource with a plurality of other data communication units. The wireless data communication unit (700) receives channel status information from a wireless serving communication unit on an outbound channel (100) and transmits data to the wireless serving communication unit on an inbound channel. The wireless communication unit includes a processor (708) for monitoring channel status symbols inserted on the outbound channel, such that the processor (708) regulates time intervals between successive data transmissions (480) on the inbound channel dependent upon the monitored channel status symbols inserted on the outbound channel. A method of sharing a communication resource is also described.

13 Claims, 4 Drawing Sheets

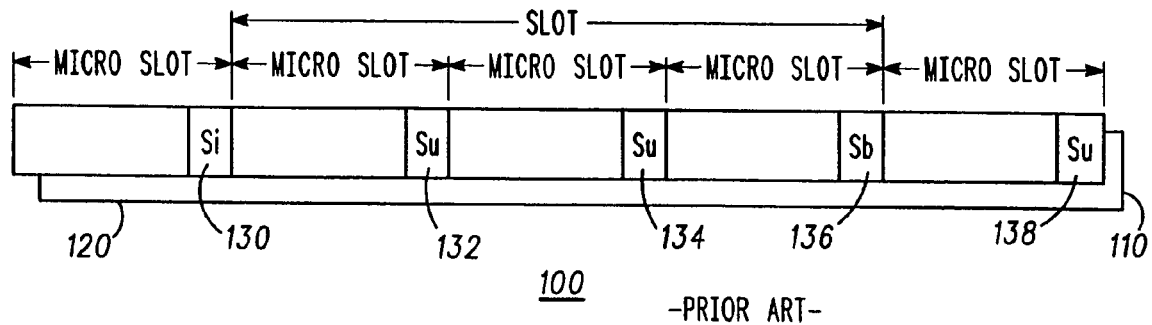
FIG. 1 —PRIOR ART—
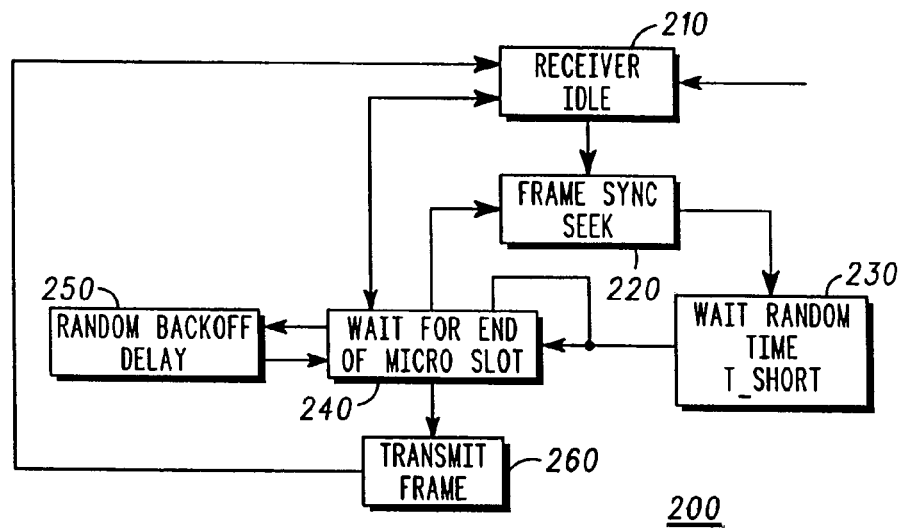
FIG. 2 PRIOR ART
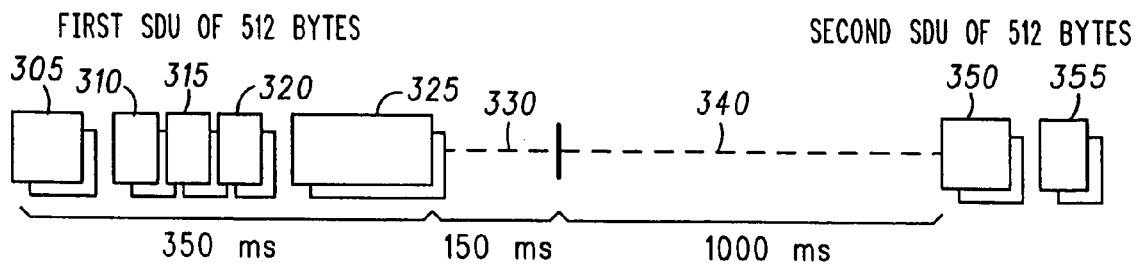
FIG. 3 —PRIOR ART—

WIRELESS DATA COMMUNICATION UNIT

FIELD OF THE INVENTION

This invention relates to a data communication unit sharing a communication resource between a number of other data communication units. The invention is applicable to, but not limited to, regulation of time intervals between successive messages transmit from at least one such data communication unit.

BACKGROUND OF THE INVENTION

Wireless voice and/or datacommunication systems, for example cellular telephony or private mobile radio communication systems, typically provide for radio telecommunication links to be arranged between a plurality of base transceiver stations (BTSs) and a plurality of subscriber units, often termed mobile stations (MSs). The term mobile station generally includes both hand-portable and vehicular mounted radio units. Furthermore, the communications link from a BTS to a MS is referred as to the down-link (or outbound) path. Conversely, the communications link from a MS to a BTS is referred to as the up-link (or inbound) path.

In a wireless communication system, each BTS has associated with it a particular geographical coverage area (or cell). The coverage area defines a particular range that the BTS can maintain acceptable communications with MSs operating within its serving cell. Multiple access techniques permit simultaneous transmissions from several MS to a single BTS over a plurality of communications channels.

Some channels are used for carrying traffic communications, whilst other channels (which may be logical or dedicated channels) are used for transferring control information, such as call paging, between the base transceiver stations and subscriber units. Examples of multiple access techniques include: frequency division multiple access (FDMA), time division multiplexing/multiple access (TDM, TDMA) and code division multiple access (CDMA).

Many data communication systems use contention mode as a means of allowing access to a shared communication channel/resource. In data communication systems operating contention mode access schemes, much effort has been directed at improving channel access by fast, fair and efficient means. Typical channel accessing techniques that exist are based on monitoring of the communication channel before contention. Some techniques are based on a use of control channels to allocate a particular time slot or frequency for a user wishing to gain access to a communication resource.

Referring now to FIG. 1, a Radio Data—Link Access Protocol (RD-LAP) channel contention mechanism 100 for an outbound channel in a data communication system is shown. The data communication system employs, for example, a Slotted Digital Sense Multiple Access (Slotted-DSMA) technique, to provide wireless data communication units (data modems) access to a communication resource, i.e. an inbound channel. The communication resource is shared amongst a number of data modems. A multiple access protocol is required to control and limit the amount of interference/collisions between the data modems, when requesting access to, or transmitting on, the communication resource.

An active data base (transceiver) station (DBS) continuously inserts Channel Status symbols 130, 132, 134, 136, 138 between outbound data transmissions 120 on the outbound channel 110. The DBS inserts the symbols in response to a determination of whether the corresponding inbound channel is 'BUSY' or 'IDLE'.

One or more of the data modems is configured to observe these periodic channel status symbols 130, 132, 134, 136, 138 and make a decision on whether to contend or not for an access to the inbound channel.

The procedure for transmission of data packets 200, in the RD-LAP channel contention mechanism 100 of FIG. 1, is shown in FIG. 2. A data modem remains idle, in step 210, until a new protocol data unit (PDU) is received for transmission. A PDU relates to an information portion of a frame which includes address and control information, and optionally data. It is assumed that after an idle period, the data modem is not synchronised to the frame structure of the RD-LAP channel, and therefore enters a frame synchronisation mode, as shown in step 220.

Once frame sycnhronisation has been detected, the data modem waits a random time in order to decrease the risk of possible collisions with other units, in step 230. If the channel state is unknown, the data modem waits until it receives a channel state symbol to determine the status of the channel, in step 240. If the data modem loses frame synch during these waiting periods, the process generally returns to step 220 in re-seeking frame synchronisation.

If the data modem has acquired (or maintained) frame synch when receiving a new PDU in step 210, the process moves immediately to waiting for the end of a microslot in step 240. At the end of a slot, if the channel is determined as being 'busy' the data modem introduces a random back-off delay in step 250, and waits again for an end of slot period when the channel is 'idle'. When an end of slot is subsequently found, and the channel is determined as being 'idle', the new PDU is transmit to the DBS, in step 260. Once the transmission is complete, the data modem returns to an 'idle' receive state.

In the RD-LAP data communication system, it is known that existing data (modulator/demodulator) modems regulate the traffic loading on the data communication system in order to minimise collisions between different transmitting data units. The regulation is achieved by the communicating modems inserting a fixed time interval, a so called 'SDU time interval', between two successive messages, as shown in relation to FIG. 3.

FIG. 3 shows a timing structure 300 for a data modem's transmission. The data modem transmits a first Service Data Unit (SDU) 310 of say, 512 bytes. The first SDU 310 includes a warm-up field 315, followed by a preamble 320, a frame sync. 325 and station identifier (ID) 330. The data message 335 is then sent to a HOST, followed by a synchronisation period of 150 msec. A fixed SDU time interval 340 of at least one second is then inserted by the data modem before the second SDU 350 can be sent.

The inventors of the present invention have appreciated that the use of the fixed SDU time interval 340 effectively limits the throughput on the inbound data communication channel, even though it reduces, to some degree, the possibility of collisions. Thus, the SDU time interval 340 is the dominant factor in the timing of data modem transmissions.

However, the insertion of an SDU time interval 340 does not completely prevent uncontrolled collisions for all situations. For example, too many data modems may be using the available communication resource. When this happens, the effect of the SDU time interval is minimal as more data communication units attempt to access ever few communication resources. Eventually, if the channel reaches an overloaded state, no benefit can be gained by employing an SDU time interval.

Furthermore, by inserting gaps in the transmission to reduce the risk of collision, the data throughput per data communication unit (modem) is reduced. An example of a data message that may be affected by the reduced throughput could be, say, from a police officer in a car to a control centre. The message might be a query about the registration details of a particular car which has been stopped or is being followed by the police. A return message will contain the reply to the Police Officer's request for information. Clearly, in such situations, speed and reliability of the communication is paramount.

However, in practice as a result of employing an SDU time interval, the utilisation of the inbound channel does not exceed 20% for any single modem. This level of performance is unsatisfactory for such time-critical communication.

Thus, the SDU time interval mechanism has the disadvantage that it limits inbound throughput to an unacceptable level and is also not a failsafe mechanism for preventing uncontrolled collisions if the channel is overloaded. A need therefore exists for a mechanism to improve the channel loading of a data communication system, wherein the above-mentioned disadvantages may be alleviated.

SUMMARY OF THE INVENTION

In accordance with a first aspect of the present invention, there is provided a wireless data communication unit, as claimed in Claim 1.

In accordance with a second aspect of the present invention, there is provided a wireless data communication system, as claimed in Claim 5.

In accordance with a third aspect of the present invention, there is provided a method of sharing a wireless communication resource, as claimed in Claim 6.

In accordance with a fourth aspect of the present invention, there is provided a storage element, as claimed in Claim 10.

In summary, a preferred embodiment of the present invention utilises an adaptive channel loading (ACL) method where the regulation of SDU time intervals between successive messages is dependent upon the current status of the inbound channel. The ACL method is based on continuous monitoring of the channel status symbols inserted in the outbound data stream. These channel status symbols are evaluated to determine a ratio between a number of IDLE statuses and a total number of received channel state symbols. This ratio is then used as a criterion for a decision on what time interval is to be used between two successive messages. The time interval is selected in order to provide maximal channel utilisation without exceeding the channel capacity.

Advantageously, the proposed technique of adapting the SDU time interval in the above manner allows an improvement of upto twice the inbound channel utilisation and thereby overall throughput.

BRIEF DESCRIPTION OF THE DRAWINGS

FIG. 1 shows a timing diagram of a known data communication modem transmitting in a data communication system operating an RD-LAP protocol;

FIG. 2 is a flowchart illustrating a known RD-LAP transmit procedure; and

FIG. 3 shows a timing diagram of a data modem implementing a SDU time interval in an RD-LAP data communication system.

Exemplary embodiments of the present invention will now be described, with reference to FIGS. 4-7 of the accompanying drawings.

DETAILED DESCRIPTION OF EMBODIMENTS OF THE INVENTION

Figure 4:
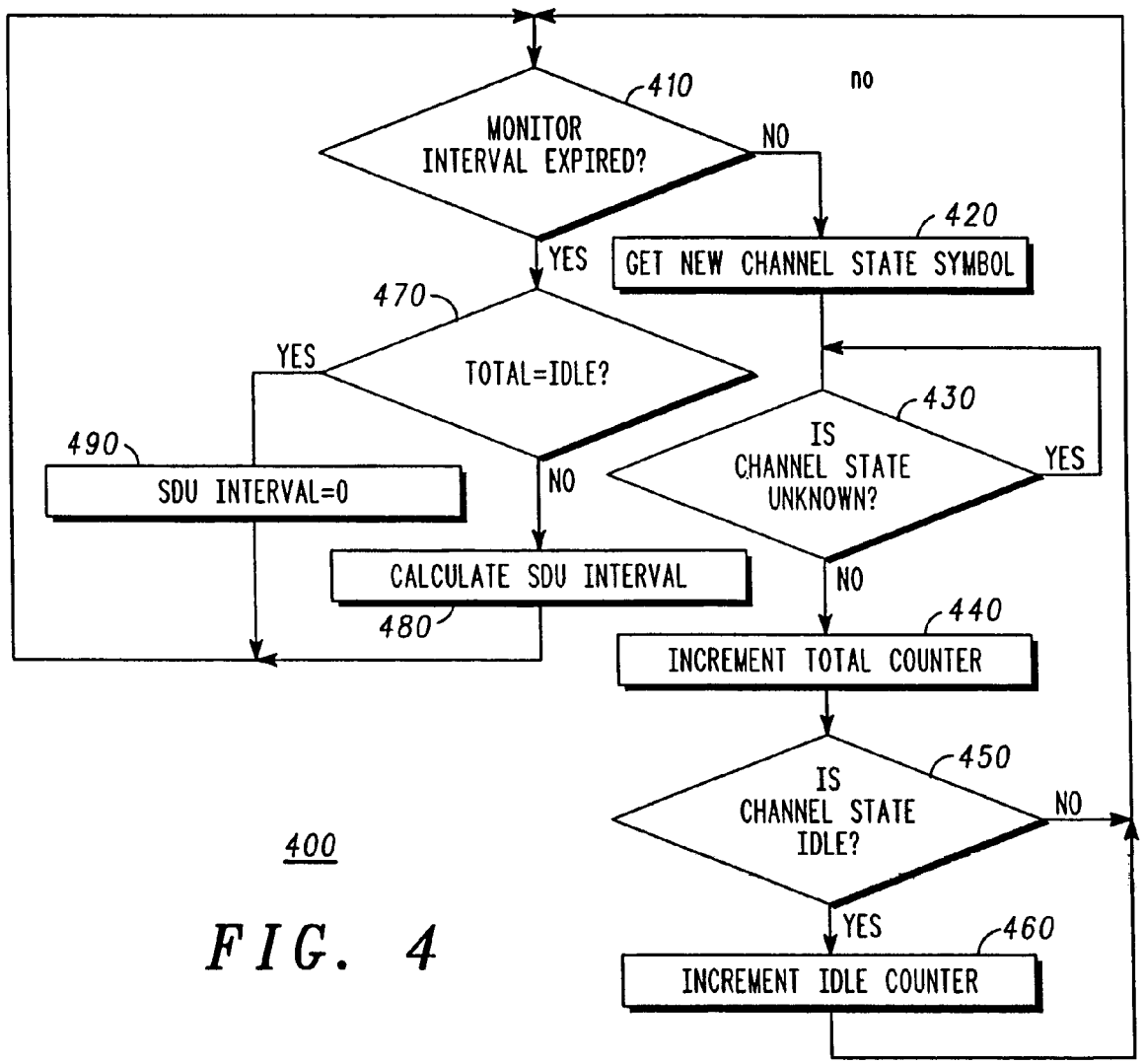
FIG. 4 is a flowchart illustrating a process for reducing the time interval between successive data transmissions in an RD-LAP data communication system in accordance with the preferred embodiment of the invention.

Referring now to FIG. 4, a flowchart 400 illustrates the channel state monitoring operation in accordance with the preferred embodiment of the present invention. The focus is to provide an adaptable channel loading (ACL) mechanism that uses the channel state monitoring operation to obtain improved channel utilisation.

The channel state is continuously monitored in order to determine when the monitor interval has expired in step 410. Whilst the interval has not expired, in step 410, a new channel state symbol is obtained by the data modem, as shown in step 420. Analysing the channel state symbols enables the data modem to determine roughly the status of the communication channel at that time, in step 430. If the channel status is unknown, i.e. the data modem does not know whether the channel is 'busy' or 'idle', then in step 430, the data modem waits until the last microslot, where a channel state symbol must be inserted in accordance with the RD-LAP protocol. If the channel state symbol is recognised and analysed by the data modem in step 430, then the "total counter" is incremented, in step 440.

A determination is then made as to whether the channel status is idle, in step 450. If the channel status is idle in step 450, the 'idle' counter is also incremented in step 460. Otherwise, or following step 460, the method returns to determining whether the monitor interval has expired in step 410. In this manner, a determination is made as to the percentage of 'idle' microslots compared to the total number of microslots received on the outbound channel.

When the monitor interval has expired in step 410, a determination is made as to whether the value of the 'total' counter equals the value of the 'idle' counter, in step 470. If the counter values are equal, in step 470, then the data modem assumes that the channel is in an 'idle' state. The data modem then sets the SDU time interval to '0', in step 490.

Otherwise, the value of the 'total' counter is determined as not being equal to the value of the 'idle' counter. In this regard, the data modem assumes that the channel has been in a 'busy' state. The data modem then calculates a new SDU time interval in step 480, and as described in FIG. 5. The data transmission process will then use the revised SDU time interval, until such time as the process in FIG. 4 dictates otherwise. The process then returns to continuously determining whether the monitor interval has expired in step 410.

As indicated, the method is based on an on-going monitoring of the receive data channel. Each data modem evaluates the ratio between an 'idle' counter and a 'total' counter for received channel state symbols. This, in effect, indicates an IDLE or BUSY status of the inbound channel.

Figure 5:
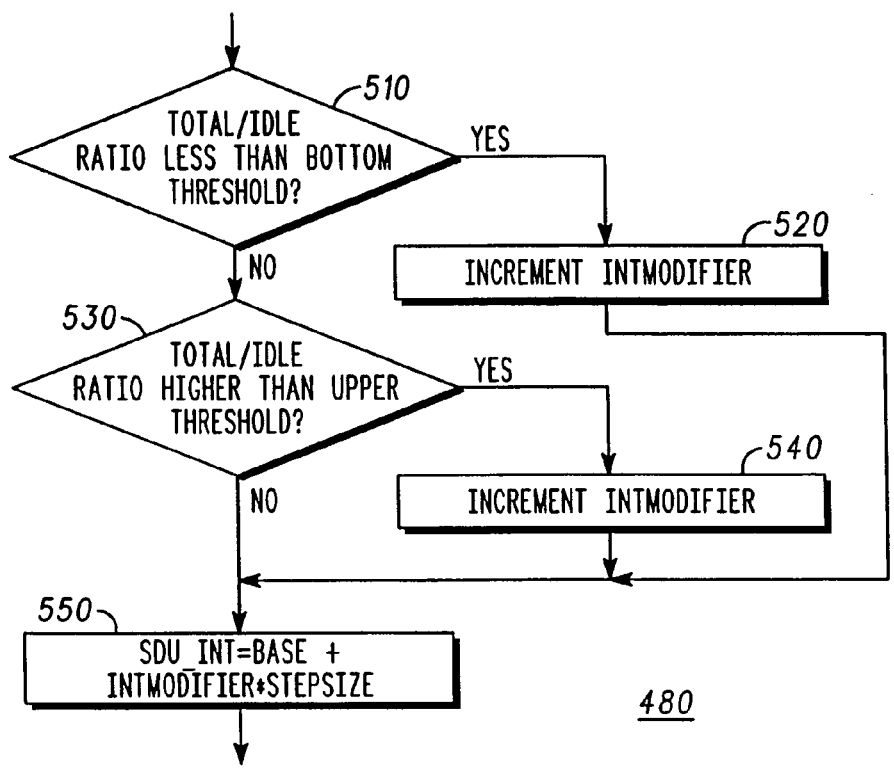
FIG. 5 is a flowchart of the decision making process for performing a modified SDU time interval, in accordance with a preferred embodiment of the invention.

Referring now to FIG. 5, a flowchart illustrates the adaptive SDU calculation function (step 480 in FIG. 4) in accordance with the preferred embodiment of the present invention. In particular, the flowchart shows how the SDU time interval is adapted in the preferred embodiment of the present invention. An adaptive SDU time interval is used as an instrument for compromise between transmission throughput and avoidance of transmission collisions, whilst not exceeding the channel capacity.

A determination is first made as to whether the ratio between the value of the total counter compared to the value of the idle counter is less than a lower threshold, as in step 510. In the preferred embodiment of the present invention, this threshold has been set to approximately 30%. If the ratio is less than the lower threshold in step 510, the modem (preferably a vehicular radio modem (VRM)) increases the time interval between subsequent SDUs, as shown in step 520. If the threshold is less than 30%, the data modem assumes that the channel is predominantly 'busy' due to the relatively low count of the 'idle' counter. In this manner, the data modem sends less frequent SDU messages, thereby reducing the number of collisions.

If the ratio is not less than the lower threshold in step 510, a determination is then made as to whether the ratio between the value of the total counter compared to the value of the idle counter is higher than an upper threshold, as in step 530. In the preferred embodiment of the present invention, this higher threshold has been set to approximately 50%. If the ratio is greater than the higher threshold in step 530, the modem decreases the time interval between subsequent SDUs, as shown in step 540. If the threshold is higher than 50%, the data modem assumes that the channel is predominantly 'idle' due to the relatively high count of the 'idle' counter. In this manner, the data modem is able to send more frequent SDU messages, without substantially increasing the risk of collisions.

Otherwise, or following steps 520 or 540, the SDU time interval is modified to reflect the initial value (base) added to the time interval modifier multiplied by the step size, as shown in step 550. In the preferred embodiment of the present invention, the base interval is set to approximately 10 msec's, with a step size of 10 msec's. A skilled artisan will recognise that the interval modifier in this context has no upper limit, and will continue to increase the SDU time interval is the channel remains 'busy'.

It is within the contemplation of the invention that different ratios or thresholds may be used, dependent upon the data communication system employing the inventive concepts described herein.

In this manner, an individual data modem acquires improved channel utilisation whilst optimally sharing the channel if there is more than one data modem unit transmitting on the communication resource.

Figure 6:
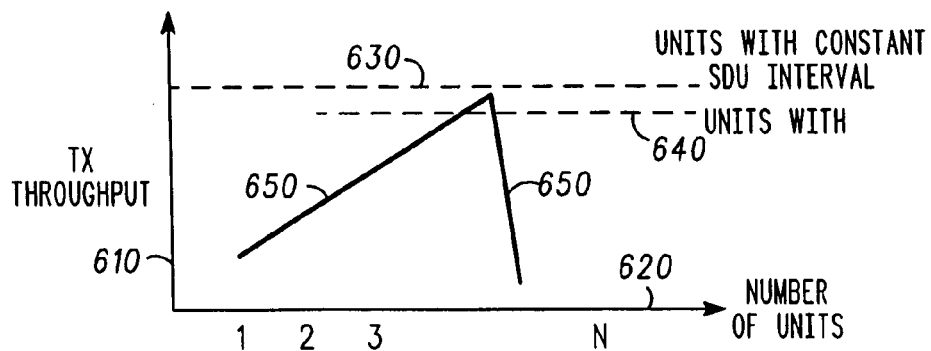
FIG. 6 illustrates a graph showing the improvement in transmission throughput of an RD-LAP data communication system employing the inventive concepts of the preferred embodiment of the present invention.

Referring now to FIG. 6, a graph 600 illustrates the results of adaptive channel loading versus the known constant SDU time interval approach. The graph 600 illustrates a plot of transmit throughput 610 versus a number of transmitting data modem units 620. A theoretically ideal (maximum transmit) throughput is shown with line 630, whereby no collisions occur, and a data modem is always transmitting a PDU.

Using the constant SDU time interval of known RD-LAP data communication systems, it can be seen that the system fails to cope with any more than, say, five transmitting data modem units, as well as providing poor throughput to fewer transmitting data modem units, as shown by line 650. In contrast, a data modem unit employing the inventive concepts hereinbefore described provides a constantly high transmit throughput performance, as shown by line 640.

Figure 7:
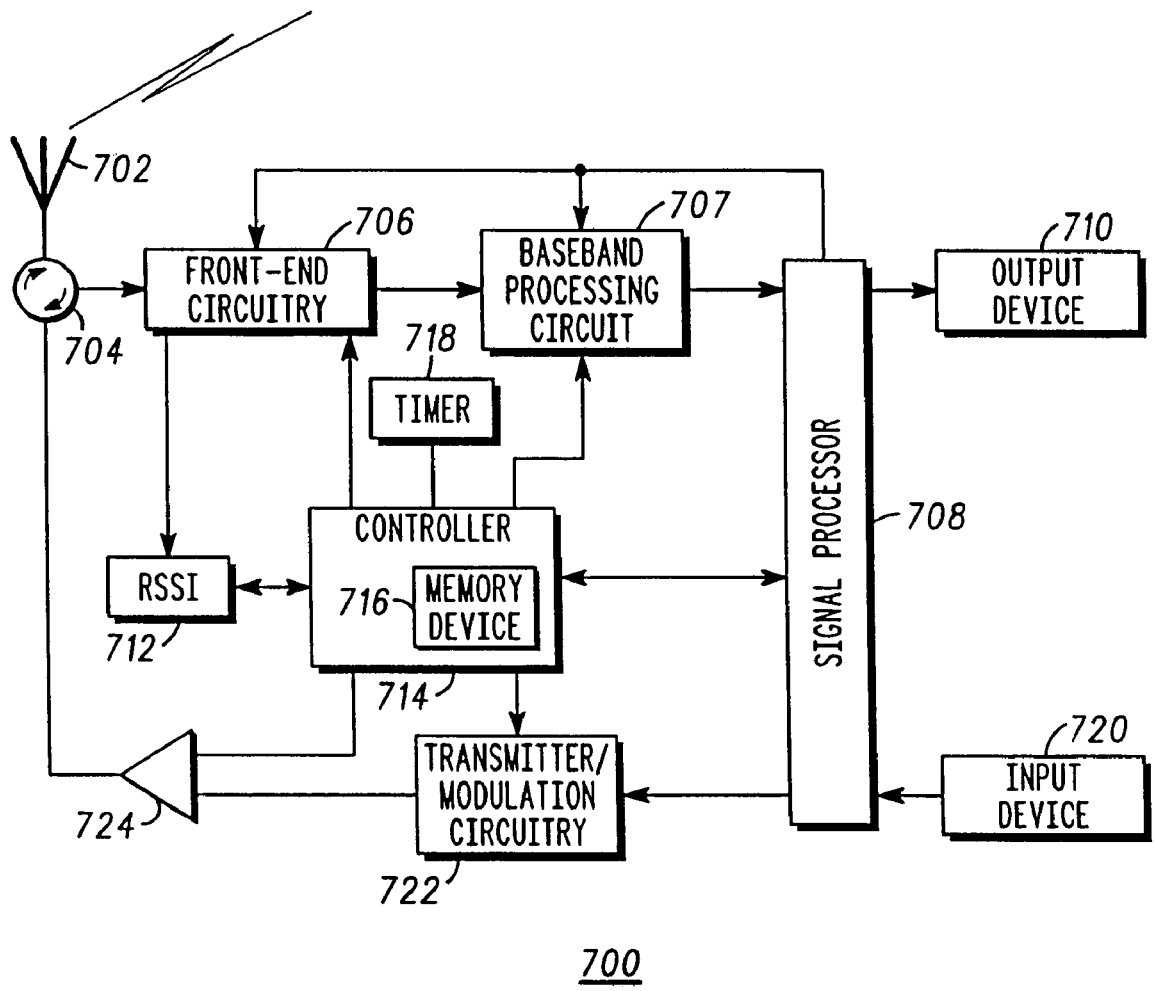
FIG. 7 illustrates a block diagram of a data modem adapted in accordance with the preferred embodiment of the present invention.

Referring now to FIG. 7, a block diagram of a data communication modem, for example a vehicular radio modem (VRM) 700, adapted to support the inventive concepts of the preferred embodiments of the present invention, is shown.

The VRM 700 contains an antenna 702 preferably coupled to a duplex filter or circulator or antenna switch 704 that provides isolation between receive and transmit chains within the VRM 700.

The receiver chain includes scanning receiver front-end circuitry 706 (effectively providing reception, filtering and intermediate or base-band frequency conversion). The scanning front-end circuit 706 is serially coupled to a signal processing function (generally realised by a DSP) 708 via a baseband (back-end) processing circuit 707.

A controller 714 is operably coupled to the scanning front-end circuitry 706 so that the receiver can calculate receive bit-error-rate (BER) or frame-error-rate (FER) or similar link-quality measurement data from recovered information via a received signal strength indication (RSSI) 712 function. The RSSI 712 function is operably coupled to the scanning front-end circuit 706. The memory device 716 stores a wide array of VRM-specific data, for example decoding/encoding functions, frequency and timing information for the communication unit, etc.

A timer 718 is operably coupled to the controller 714 to control the timing of operations, namely the transmission or reception of time-dependent signals, within the VRM 700. As known in the art, received signals that are processed by the signal processing function are typically input to an output device, such as a visual display unit.

The transmit chain essentially includes an input device 720, such as a keypad or keyboard to enter, for example, information requests to a central police dispatcher. The transmit chain is coupled in series through a processor 708, transmitter/modulation circuitry 722 and a power amplifier 724. The processor 708, transmitter/modulation circuitry 722 and the power amplifier 724 are operationally responsive to the controller, with an output from the power amplifier coupled to the duplex filter or circulator or antenna switch 704, as known in the art.

In accordance with a preferred embodiment of the present invention, the signal processing function 708, in conjunction with the memory device 716 and controller 714, have been adapted to modify the SDU time interval for data modem transmissions from the VRM 700. In particular, the processor 708, in conjunction with the scanning front-end circuitry 706, monitors the channel state symbols that are transmit from the DBS. The processor 708 increments/decrements counters in response to determining whether the shared channel is 'idle' or 'busy'.

In the VRM 700, the signal processor function 708 in the transmit chain may be implemented as distinct from the processor in the receive chain. Alternatively, a single processor 708 may be used to implement the processing of both transmit and receive signals, as shown in FIG. 7.

Of course, the various components within the VRM 700 may be realised in discrete or integrated component form. Furthermore, it is within the contemplation of the invention that the VRM 700 may be any wireless data communication device using RD-LAP technology, such as a portable or mobile PMR radio, a mobile phone, a wireless laptop computer, etc.

More generally, any re-programming or adaptation of the processor 708, according to the preferred embodiment of the present invention, may be implemented in any suitable manner. For example, a new processor 708 or memory device 716 may be added to a VRM 700, or alternatively existing parts of a VRM may be adapted, for example by reprogramming one or more processors therein. The (re-) programming operation may include, for example, a new adaptive channel loading algorithm and/or threshold values, new ratios, etc. As such the required adaptation may be implemented in the form of processor-implementable instructions stored on a storage medium, such as a floppy disk, hard disk, PROM, RAM or any combination of these or other storage multimedia.

The invention is described with reference to an RD-LAP data communication system. However, it is within the contemplation of the invention that the inventive concepts described herein apply to any wireless data communication system, particularly those suffering from random collisions and poor data throughput.

It will be understood that the adaptive channel loading mechanism described above, provides at least, the following advantages:
 (i) Provides improved channel utilisation;
 (ii) Reduces the number of collisions when data modem units are attempting to transmit PDUs
 (iii) Reduces an average transmit time in transmitting PDUs, thereby allowing more time for a data modem to receive transmissions from a DBS; and
 (iv) Provides a failsafe mechanism to avoid the channel capacity from being theoretically exceeded, which results in no or minimal data throughput.

Whilst specific, and preferred, implementations of the present invention are described above, it is clear that one skilled in the art could readily apply variations and modifications of such inventive concepts.

Thus, a communication unit, a communication system and method of minimising collisions have been provided wherein the disadvantages associated with prior art arrangements have been substantially alleviated.

The invention claimed is:

1. A wireless data communication terminal sharing a data communication resource with a plurality of other data communication terminals, the wireless data communication terminal being operable to receive channel status information from a wireless serving communication terminal on an outbound channel and to transmit data to said wireless serving communication terminal on an inbound channel, the wireless data communication terminal comprising a processor operable to monitor channel status symbols inserted on the outbound channel; and to regulate time intervals between successive data transmissions on said inbound channel dependent upon said monitored channel status symbols inserted on the outbound channel, wherein the time intervals are adaptive, said processor is operable to determine a number of busy or idle timeslots in said data transmission on the outbound channel, and to determine what time interval should be set between two successive data messages based on said determination.

2. The wireless communication terminal according to claim 1, wherein said monitored channel status symbols inserted on the outbound channel indicate a current status of the inbound channel, thereby enabling said wireless communication unit to transmit data packets on said inbound channel dependent upon adaptive channel loading of the inbound communication resource.

3. The wireless communication terminal according to claim 2, wherein said processor is operable to determine a number of busy or idle timeslots in said data transmission on the outbound channel, and to determine what time interval should be set between two successive data messages based on said determination.

4. The wireless communication terminal according to claim 3, wherein said processor is operable to employ a dual counter mechanism, including a first counter to count a total number of channel state symbols transmit on said outbound channel and a second counter to count a number of channel-busy or channel-idle indications of said channel state symbols, wherein said processor is operable to determine whether to increase or decrease said time intervals between successive data transmissions dependent upon whether said ratio of counters exceeds or is below at least one threshold value.

5. The wireless communication terminal according to claim 1, wherein said processor is operable to employ a dual counter mechanism, including a first counter to count a total number of channel state symbols transmit on said outbound channel and a second counter to count a number of channel-busy or channel-idle indications of said channel state symbols, wherein said processor is operable to determine whether to increase or decrease said time intervals between successive data transmissions dependent upon whether said ratio of counters exceeds or is below at least one threshold value.

6. A wireless data communication system supporting an RD-LAP data transmission protocol including a plurality of wireless data communication terminals, wherein the terminals share a data communication resource, and each of the terminals is operable to receive channel status information from a wireless serving communication terminal on an outbound channel and to transmit data to said wireless serving communication terminal on an inbound channel, each wireless data communication terminal comprising a processor operable to monitor channel status symbols inserted on the outbound channel to determine a number of busy or idle timeslots; and to regulate time intervals between successive data transmissions on said inbound channel based upon the determined number of busy or idle slots, wherein the time intervals are adaptive time intervals in the RD-LAP wireless data communication system.

7. A method of sharing a data communication resource in a wireless data communication system, wherein at least one wireless data communication terminal receives channel status information from a wireless serving communication terminal on an outbound channel and transmits data to said wireless serving communication terminal on an inbound channel, the method comprising the steps of:
 inserting channel status symbols on said outbound channel by said wireless serving communication terminal; and
 monitoring, by said at least one wireless data communication terminal, channel status symbols inserted on said outbound channel;
 determining a number of busy or idle timeslots in said data transmission on the outbound channel;
 determining what time interval should be set between two successive data messages transmit from said wireless data communication unit based on said determination of a number of busy or idle timeslots; and
 regulating time intervals between successive data transmissions on said inbound channel, by said at least one wireless data communication terminal, dependent upon said monitored channel status symbols inserted on the outbound channel, wherein the time intervals are adaptive.

8. The method according to claim 7, wherein said step of inserting channel status symbols on the outbound channel indicates a current status of the inbound channel.

9. The method according to claim 7, further comprising:
employing a dual counter mechanism, wherein a first counter counts a total number of channel state symbols transmit on said outbound channel and a second counter counts a number of channel-busy or channel-idle indications of said channel state symbols; and
determining whether to increase or decrease said time intervals between successive data transmissions dependent upon whether said ratio of counters exceeds or is below at least one threshold value.

10. The method according to claim 7, further comprising:
employing a dual counter mechanism, wherein a first counter counts a total number of channel state symbols transmit on said outbound channel and a second counter counts a number of channel-busy or channel-idle indications of said channel state symbols; and
determining whether to increase or decrease said time intervals between successive data transmissions dependent upon whether said ratio of counters exceeds or is below at least one threshold value.

11. The method according to claim 7, wherein said wireless communication data communication system supports an RD-LAP data transmission protocol.

12. A storage medium storing processor-implementable instructions or data for controlling a processor to carry out a method of sharing a data communication resource in a wireless data communication system wherein at least one wireless data communication terminal receives channel status information from a wireless serving communication terminal on an outbound channel and transmits data to said wireless serving communication terminal on an inbound channel, the method carried out by the processor comprising the steps of:

inserting channel status symbols on said outbound channel by said wireless serving communication terminal; and monitoring, by said at least one wireless data communication terminal, channel status symbols inserted on said outbound channel;

determining a number of busy or idle timeslots in said data transmission on the outbound channel;

determining what time interval should be set between two successive data messages transmit from said wireless data communication unit based on said determination of a number of busy or idle timeslots; and regulating time intervals between successive data transmissions on said inbound channel, by said at least one wireless data communication terminal, dependent upon said monitored channel status symbols inserted on the outbound channel, wherein the time intervals are adaptive.

13. The wireless communication terminal according to claim 1, wherein said wireless communication terminal supports an RD-LAP data transmission protocol.

* * * * *